United States Patent [19]
Wilk

[11] 3,815,963
[45] June 11, 1974

[54] PSEUDO-DIAMAGNETIC SUSPENSION AND PSEUDO-DIADIELECTRONIC SUSPENSION

[75] Inventor: Leonard S. Wilk, Winchester, Mass.
[73] Assignee: Massachusetts Institute of Technology, Cambridge, Mass.
[22] Filed: July 17, 1972
[21] Appl. No.: 272,601

[52] U.S. Cl. .................................................. 308/10
[51] Int. Cl. ............................................ F16c 39/06
[58] Field of Search............................ 308/10; 74/5

[56] References Cited
UNITED STATES PATENTS

| | | | |
|---|---|---|---|
| 3,215,901 | 11/1965 | Carnok | 308/10 |
| 3,447,842 | 6/1969 | Steingroever | 308/10 |
| 3,508,444 | 4/1970 | Sitomer | 308/10 |
| 3,512,852 | 5/1970 | North | 308/10 |
| 3,663,075 | 5/1972 | Kronenberg | 308/10 |

*Primary Examiner*—R. Skudy
*Attorney, Agent, or Firm*—Arthur A. Smith, Jr.; Martin M. Santa; Robert Shaw

[57] ABSTRACT

A system for levitating or suspending an object through the use of magnetic or electric fields wherein a primary magnetic field, for example, is established in an operating region so as to have its energy density divergence oriented in a preselected direction and a secondary magnetic field is generated so that its flux lines in the operating region are in a direction opposite to the primary field. The total magnetic field in this operating region common to both fields is detected and the field strength of the secondary field is controlled in accordance therewith so that the detected field strength is diminished. The consequent forces on the field generating means can be used for levitation or suspension. Thus, if the primary magnetic field generating means is fixedly mounted, the object which is then a part of the secondary magnetic field generating means can be levitated, and vice-versa

15 Claims, 3 Drawing Figures

PSEUDO-DIAMAGNETIC SUSPENSION AND PSEUDO-DIADIELECTRONIC SUSPENSION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

INTRODUCTION

This invention relates generally to the levitation or suspension of objects and, more particularly, in a preferred embodiment thereof to the levitation or suspension of materials in a magnetic or electric field.

BACKGROUND OF THE INVENTION

The use of magnetic and electrostatic forces for levitating material in free space has been suggested as being particularly advantageous where it is desired that a body be supported without contact with another solid body or any other medium other than air or within a vacuum. Such support is thus obtained without the presence of mechanical friction and the consequent need for lubricants with reference to levitated objects having relatively moving surfaces. The suspension, or levitation, of materials through the use of permanent magnets was suggested in the early nineteenth century, and some systems, as discussed below, have been devised for stably supporting objects through the use of magnetic, and in some cases, electric fields. As used here, the term "levitation" means a "free" suspension of an object; that is, the object when levitated is out of contact with any other object and, hence, is not subject to a contact restraint in any direction. The term suspension, as used here, means that an object when suspended is in contact restraint in a single direction, e.g., a suspended object is tethered to a single contact point.

Levitation or suspension can prove particularly useful in many applications where reduced friction and wear over long periods of time is desired, such as in the levitation of motor rotors and gyroscopes, for example. Other applications in laboratory equipment and even the ultimate levitation or suspension of extremely heavy objects, such as magnetically levitated trains, have been envisioned.

DISCUSSION OF THE PRIOR ART

Prior art systems which have been suggested or actually achieved have included varied approaches, particularly in providing for the suspension or levitation of articles in a magnetic field. A useful summary of such prior art systems can be found in the publication "Magnetic and Electric Suspensions — A Survey of Their Design, Construction and Use" (P.J. Geary, British Scientific Instrument Research Association Report R314, 1964).

One such suggested system, for example, is a magnetic levitation technique using diamagnetic materials in a statis magnetic field. While the concept of using diamagnetic materials, i.e., materials having relative permeabilities less than 1, has been discussed, none of the systems proposed have been able to develop sufficiently high forces to support other than very small and relatively light objects. Moreover, the diamagnetic characteristics of such substances are relatively limited and their use thereof up to now has been confined to extremely specialized devices. One example thereof is described in the article "Sensitive Tilt Meter Utilizing A Diamagnetic Suspension," Simon et al., The Review of Scientific Instruments, November 1968, Vol. 39, No. 11, page 1,666 et seq.

The use of superconducting materials for achieving levitation in a static magnetic field has also been suggested. Since the relative permeability of such materials is zero, such materials tend to act as "perfectly diamagnetic" materials. However, in the operation of such systems which have been proposed, the superconducting materials must be maintained at extremely low temperatures in the cryogenic region below approximately 20° K. The need for such a temperature environment makes the use of such systems impractical in most applications.

Electromagnetic levitation systems have further been suggested by the prior art, wherein currents through one or more appropriately positioned electromagnets are automatically regulated so as to maintain an object in an appropriately levitated position within the magnetic fields established thereby. If direct current is used to establish the magnetic fields thereof, the position of the levitated object must be directly measured through an accurate, and relatively expensive, optical or electrical measuring system. If alternating current is used to establish the magnetic field thereof, the position measurement may be simplified but the device then may become relatively inefficient as increased losses occur as a result of the a-c operation.

Electromagnetic levitation utilizing eddy currents has also been achieved. In such systems alternating current is required, resulting in inefficient operation. Further, the stability of such systems may be extremely difficult to maintain. Further, the presence of eddy currents in the levitated object may cause the object to be undesirably heated due to eddy current losses and the heating involved may be sufficiently excessive to prevent the use of such a system in many applications.

While the use of electric field levitation has been achieved with the automatic regulation of the voltages of appropriately positioned electric field generating means, such systems suffer from similar disadvantages discussed above with reference to analogous electromagnetic field levitation systems. Accordingly, in the electric field system, if d-c voltages are used to establish the electric fields thereof the position of the levitated object must be directly and accurately measured with similar relatively expensive optical or electrical instrumentation. Further, if a-c voltages are used, voltage breakdowns at lower force levels tend to occur.

DESCRIPTION OF THE INVENTION

In the system of the invention, as described in more detail below, the general concepts underlying the use of diamagnetic materials for levitation or suspension are utilized without the necessity for the presence of any diamagnetic materials themselves therefor. In the system of the invention a primary static magnetic field is appropriately shaped so as to provide a region, the operating region, wherein the magnetic field energy density (i.e., a flux density squared) has divergence (spatial variation). Thus, in a preferred embodiment thereof a primary magnetic field (with appropriate divergence characteristics) is established, the flux lines of which in the operating region generally lie along a first direction. More specifically, the divergence of the energy density of the primary magnetic field in the operating region is oriented in a preferred direction in accordance with the disturbance forces which are to be balanced, e.g., a gravitational force.

A secondary magnetic field is then generated within the primary field in the operating region, the flux lines of the secondary field being in a direction opposite to that of the primary field. Means are provided for detecting the magnetic field strength at the operating region which is common to both fields. Additional means responsive to such detecting means then provide the secondary magnetic field, thus the total magnetic field strength in the operating region is diminished. If the means which establishes the primary magnetic field is held in a fixedly mounted position, the forces which are produced on the means for generating the secondary magnetic field permits it to be levitated or suspended in the operating region in a stable fashion. In a similar manner, if the secondary field generating means is held in a fixedly mounted position, the forces which are produced on the primary magnetic field establishing means permit it to be maintained in a stably levitated position relative.

The invention and variations within the scope thereof are described in more detail below with the help of the accompanying drawings wherein FIG. 1 depicts a portion of an embodiment of the invention which partially illustrates the principles of operation thereof with reference to one axis of a levitation system;

As discussed above generally with reference to the use of diamagnetic materials, such materials can be supported in a magnetic field so long as the flux density thereof is properly shaped. Thus, if, a diamagnetic material is placed in a magnetic field it tends to move to a region of minimum flux density. Under appropriate conditions the forces on the diamagnetic material placed therein are equally balanced in all directions and the magnetic material is levitated. Such phenomenon has been previously disclosed and a description of a system utilizing diamagnetic material levitation is discussed in the above-referenced article of Simon et al.

Since the diamagneticproperties of known diamagnetic materials are extremely slight in that their relative permeabilities are only slightly less than 1 (i.e., approximately 0.999 or greater) at normal temperatures, the levitation capability of these natural materials operating in accordance with such principles is extremely limited. Theoretically, the lower the relative permeability of a material, the greater the supporting force which can be achieved, and generally the heavier object which can be so supported. Although superconducting materials have relative permeabilities equal to zero at sufficiently low temperatures, their use in practical systems are extremely limited because of the temperature environment which is required. This invention utilizes the principle of electromagnetically simulating the characteristics of diamagnetic materials (without the need for using diamagnetic materials themselves) so as to provide a system which can support relatively heavy objects in a static magnetic field, without the disadvantages discussed above with reference to the use of superconducting materials or the use of dynamically controlled electromagnetic fields which are automatically regulated in accordance with the position of the device which is suspended. In duscussing the simulated characteristics of the system of the invention relative to those of diamagnetic materials, it is helpful to recall that the force on an isotropic material of permeability $\mu$ and volume V when placed in a magnetic field $\beta$ is given by the expression:

$$\vec{F} = (1/2) V\mu_o^{-1} (1 - \mu/\mu_o) \nabla \beta^2 \quad (1)$$

wherein $\mu_o$ is the permeability of free space. The analogous system of the invention is arranged to provide a force which can be defined by a similar expression as discussed in more detail below.

Figure 1:
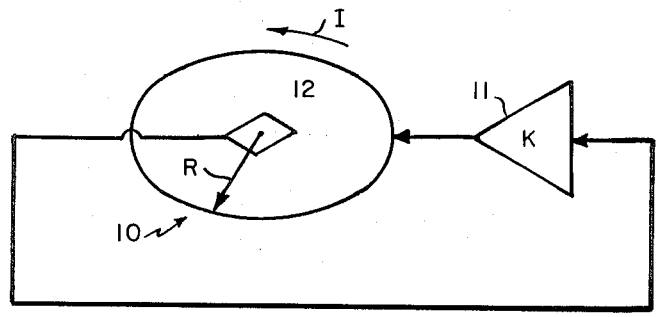

In accordance therewith, FIG. 1 shows a system which detects one component of the total magnetic field and generates the same one component of the secondary magnetic field. It includes a coil 10 through which flows a current I derived from a high gain current amplifier 11 having a gain K, the input of which is supplied from an appropriate magnetic field detection means 12 placed at the center of coil 10. If the coil has N turns and a radius of R and three of such coil systems (each with its own values of N, R and K) are placed orthogonally with respect to each other, it can be shown that under all conditions of rotational stability (neutral or positive) the force upon the coils can be expressed as:

$$\vec{F} = -\pi \mu_o^{-1} CR^3 \nabla \beta^2 \quad (2)$$

where C is defined as $$C = (1 + {}^{2R}/\mu_o NK)^{-1} \quad (3)$$

and further where $\mu_o$, R, N, K and $\beta$ are as defined above and C and R are the values associated with the coil system having the smallest value of $CR^3$.

As can be seen, Eq. (2) has the same general form as Eq. (1) if the term $(1 - \mu/\mu_o)$ of the latter equation is considered as analogous to the term C in the former equation and the term ½ V is considered as analogous to the term $\pi R^3$. Thus, C is a dimensionless quantity having a value in the range wherein $0 < C < 1$, as the amplifier gain K takes on any positive value. The term $(1 - \mu/\mu_o)$ is likewise dimensionless having a value in the same range between 0 and 1, as for diamagnetic materials. These similarities in range and dimension make their analogous natures clear. Moreover, the term ½ V is, by similar analogy, dimensionally compatible with the term $\pi R^3$.

Thus, a device consisting of an orthogonal set of circular coils, having currents proportional to their respective normal components of the magnetic fields developed at the common center thereof, will develop forces in that magnetic field that are identical to those developed with the use of a diamagnetic material of relative permeability $\mu$ such as to provide an analogy between the term $(1 - \mu/\mu_o)$ and the term (C), the latter being equal to $(1 + \mu_o NK/2R)^{-1}$ and having a volume such that ½ V is analogous to $\pi R^3$, provided the device utilizing such coils has an angular orientation such that the device is rotationally stable. The levitated device will automatically assume this orientation.

In setting up such a device for providing a substantially stable levitation force, several different modes of operation can be envisioned. For example, in one mode the primary magnetic field establishing means, such as a fixed permanent magnet, may be fixedly mounted and the coils levitated or suspended. In another mode the coils may be fixedly mounted and the primary magnetic field source levitated or suspended, either with or without an additional fixedly mounted auxiliary magnetic field source. Moreover, the rotational or linear motions thereof may be further restrained by gravitational fields or electrical fields or other restraints.

Figure 2:
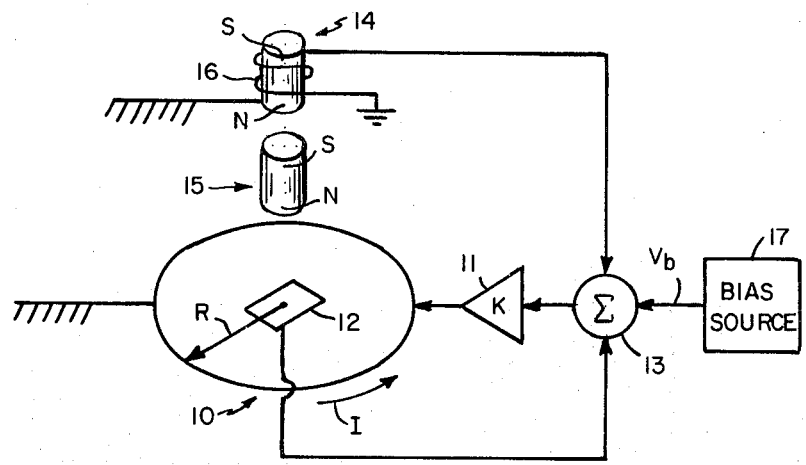
FIG. 2 depicts an embodiment for levitating an object along the direction of a gravitational field.

One configuration successfully used to demonstrate the principles of operation of the invention is shown in FIG. 2 wherein a secondary magnetic field generating coil 10 is fixedly mounted and a primary magnetic field source 15 is levitated with reference thereto. As can be seen therein the system in its simplest form is arranged so that the magnet 15 is levitated in a vertical direction along the direction of acceleration due to gravity, so that only a single coil 10 for providing a secondary magnetic field is required for levitation purposes.

Thus, a coil 10 the plane of which is perpendicular to the vertical is fixedly mounted as shown diagrammatically in FIG. 2. In a particular embodiment of the invention which has been reduced to practice to demonstrate the principles of operation thereof, the coil is arranged to have an inside diameter of 1.9 cm., $10^4$ turns and a resistance of 40 ohms. A flux density sensor 12 which in this case is a Hall effect sensor, such as Hall Sensor Model BH700 manufactured by Bell, Inc. of Columbus, Ohio, is mounted so as to sense the value of the magnetic field at the center of the coil. The output from sensor 12 is fed to one input of a summation circuit 13, one other input of which is a bias voltage $V_b$ obtained for a purpose discussed in more detail below. The output of summation circuit 13 is fed to the input of a high gain current amplifier 11 which provides an output current signal for coil 10. In the particular embodiment shown, an auxiliary permanent magnet 14 is fixedly mounted above coil 10 so that its axis lays along the vertical direction above the center of the coil as shown. Fixed magnet 14 is in the form of a cylinder 2.54 cm. in diameter and 10 cm. in length. The levitated permanent magnet 15, positioned between fixed magnet 14 and coil 10 as shown, is in the form of a cylinder 1.3 cm. in diameter and 8.9 cm. in length, with a weight of 83.6 grams. Both magnets 14 and 15 are conventional Alnico V magnets.

Levitated magnet 15 and auxiliary magnet 14 together establish a primary magnetic field, while coil 10 generates a secondary magnetic field in a direction opposite to the primary magnetic field. The Hall effect sensor 12 is used to detect the magnetic field strength at the region common to both the primary and the secondary fields at the center of the coil. In the configuration shown, the primary magnetic field lies generally in the vertical direction along that of acceleration due to gravity so that the only function required of coil 10 is to provide a secondary magnetic field generally in the opposite direction so as to produce a stabilized levitation force in such vertical direction. Hence, for the configuration shown only a single coil is required. Further, by properly selecting the spacing between magnets 14 and 15 no steady supporting force is required of the fixedly mounted coil itself, and, hence, the average current through the coil can be effectively reduced to zero, a condition which can be conveniently achieved by summing in an appropriate bias voltage $V_b$ from a bias source 17 at the input to amplifier 11.

In the configuration of FIG. 2 the cylindrical magnet 15 was stably levitated except for a slight dynamic oscillation thereof in the vertical direction. In order to correct for such dynamic oscillation which may occur, a velocity sensing coil was placed around the fixed auxiliary magnet 14. In a particular embodiment it was found that a coil of 200 turns provided an output signal which was fed to the summation circuitry 13 to damp out the undesired oscillation. The current through coil 10 of the system in FIG. 2 was maintained at a minimum level of less than 3 Ma. so that a stable levitation system at the rate of 232 kg/W was achieved, where W is the weight of the levitated magnet.

Thus, in accordance with Eq. (2) the force for levitating magnet 15 is dependent upon the gain K of the amplifier 11, the radius R and number of turns N of coil 10 and on the shape of the flux density within the common magnetic fields, including both the magnitude of the field and the spatial rate of change thereof. With the appropriate selection of such factors, a balance of magnetic and gravitational forces existed on the levitated magnet 15.

As can be seen, the system of the invention utilizes relatively simple components the costs of which can be less than those of previously suggested levitation or suspension systems, the Hall effect sensor being a relatively cheap device for detecting field strength of a magnetic field, the accuracy of which need not be very high for the operation desired.

While the above discussed embodiment of the invention shows a system which is appropriately oriented so that only a single coil is required to support an object in a gravitational field, it is clear that the same principles can be extended to the more general case wherein an appropriate balancing of forces can be achieved in any orientation by the use of three orthogonally related coil systems having suitably controlled currents for obtaining a diminished magnetic field strength at their common center.

Figure 3:
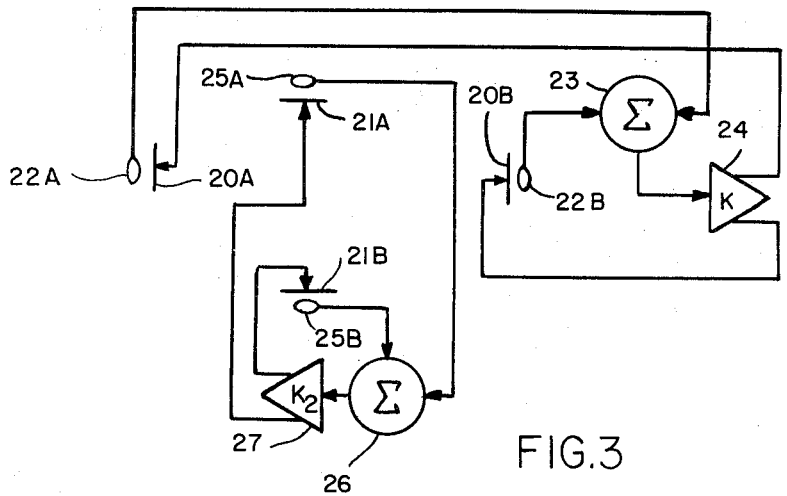
FIG. 3 depicts a suggested alternative embodiment of the invention utilizing electric fields.

FIG. 3 depicts a portion of an alternate embodiment of the invention utilizing electric fields for levitation in a manner analogous to the use of magnetic fields as discussed above, in effect simulating the shaping of electric fields with materials having a relative permittivity of less than unity. While such materials might be analogously termed as "diadielectric" materials it is known that, unlike diamagnetic materials, no such materials actually exist.

In FIG. 3, it is envisioned that an orthogonal set of secondary electric fields are established within a properly shaped primary electric field (E), which latter field has an energy density divergence which is oriented in a preferred direction, as in the case of the magnetic field system discussed above, in accordance with the disturbance forces which are to be balanced. The secondary electric fields are then arranged to have lines of force in a direction opposite to the lines of force of the primary electric field. For the sake of clarity, the means for establishing the primary field is not shown and only two of such secondary fields, as formed by parallel plate arrangements, are shown in the figure. Thus, a first pair of plates 20A and 20B form a secondary electric field therebetween in one direction, a second pair of plates 21A and 21B form a secondary electric field in a second direction, and a similar pair (not shown) in a third direction. A pair of electric field sensors are associated with each electric field to supply signals to voltage amplifiers used to supply the voltages to the plates. Thus, sensors 22A and 22B are associated with plates 20A and 20B, respectively, the voltage difference between the plates being proportional to the sum of the fields (i.e., the sum of the appropriate component of the primary electric field and the secondary field) sensed by the sensors 22A and 22B, which for this purpose are positioned symmetrically on the central axis between the plates and outside thereof as shown.

The output voltages from sensors 22A and 22B are summed at summation circuit 23, and the summation output is fed to the input of amplifier 24 to supply the voltages at the plates 20A and 20B. In a similar manner the sensors 25A and 25B are used in association with plates 21A and 21B, respectively, and their outputs are fed to summation circuit 26 and thence to the input of amplifier 27. Similar sensors and circuitry (not shown) are used with the third orthogonal set of plates.

Because of the presence of "edge" effects at the plates an accurate mathematical analysis of the design shown in FIG. 3 is relatively difficult. However, an approximate analysis can show that an expression for the force can be given as $$\vec{F} = -(1/4) \pi \epsilon_o^{-1} C_e R_e^3 \nabla D^2$$
$$= -(1/4) \pi \epsilon_o C_e R_e^3 \nabla E^2 \quad (4)$$

where $$C_e^{-1} = [(X_e/R_e) - 1]^{-2} - [(X_e/R_e) + 1]^{-2}$$
$$+ (1/2) \pi \epsilon_o R_e^2 / K_{se} K_{ae} \quad (5)$$

In Eqs. (4) and (5), $\epsilon_o$ is the permittivity of free space, E is the primary electric field strength, and D is equal to $\epsilon_o E$. Also, $R_e$ is the separation of plates (e.g., 20A and 20B), $X_e$ is the separation of sensors (e.g., 22A and 22B); $K_{se}$ is the gain of sensors (e.g., 22A and 22B), and $K_{ae}$ is the gain of amplifier (e.g., amplifier 24); these parameters being associated with the plate-sensor pairs with the smallest value of $C_e R_e^3$.

A comparison of Eqs. (2) and (4) shows the analogy between the electric and magnetic approaches to the invention.

What is claimed is:

1. A system for levitating or suspending an object in a force field comprising
   at least one means for establishing a unidirectional primary magnetic field having an energy density divergence in an operating region which is oriented in a preselected direction;
   at least one means for generating a unidirectional secondary magnetic field within said primary magnetic field, the flux lines of said secondary magnetic field in the operating region being in a direction opposite to the flux lines of said primary magnetic field;
   at least one means for detecting the total magnetic field strength within the operating region;
   at least one means responsive to said detecting means for controlling the magnetic field strength of said secondary magnetic field in response to the total magnetic field strength at said operating region so that an increase in the total magnetic field strength results in an increase of the oppositely directed secondary magnetic field and vice versa, and said object being levitated is a part of one of said field generating means and is thereby levitated by the repulsive forces which act upon said field generating means.

2. A system in accordance with claim 1 wherein said secondary magnetic-field generating means is fixedly mounted and said object which is a part of said primary magnetic field establishing means is levitated in said operating region.

3. A system in accordance with claim 1 wherein said primary magnetic field establishing means is fixedly mounted and said object containing said secondary magnetic-field generating means is levitated in said operating region.

4. A system in accordance with claim 1 wherein
   said secondary magnetic field generating means includes three orthogonally oriented magnetic field generating means;
   said detecting means includes three of said means for detecting the magnetic field strengths within the operating region common to each of said three orthogonal secondary magnetic fields, respectively, and
   said controlling means includes three means for controlling the magnetic field strengths of said three orthogonal secondary magnetic fields so that any change in magnitude of the total magnetic field strength at said common region is diminished.

5. A system in accordance with claim 1 wherein
   said secondary magnetic field generating means is a coil; and
   said controlling means includes a current amplifier responsive to the output of said detecting means for supplying a control current to said coil.

6. A system in accordance with claim 5 wherein said detecting means is a Hall effect sensor.

7. A system in accordance with claim 4 wherein
   each of said secondary magnetic field generating means is a coil, the planes of said coils being oriented in an orthogonal relationship to each other, and said coils having a common center, said common region being at said common center; and
   each of said controlling means includes a current amplifier responsive to the output of its corresponding detecting means for supplying control current to its corresponding coil.

8. A system in accordance with claim 7 wherein each of said detecting means is a Hall effect sensor.

9. A system in accordance with claim 1 and further including at least one auxiliary magnetic field generating means for assisting in the establishment of said primary magnetic field.

10. A system in accordance with claim 1 wherein said primary magnetic field generating means is a permanent magnet.

11. A system in accordance with claim 9 wherein said auxiliary magnetic field generating means is a permanent magnet.

12. A system in accordance with claim 1 wherein said primary magnetic field generating means includes a single permanent magnet for producing a primary magnetic field generally aligned with the direction of a gravitational field;

said secondary magnetic field generating means is fixedly mounted and aligned so as to produce said secondary magnetic field generally in a direction opposite to sais primary magnetic field;

a fixedly mounted auxiliary permanent magnet for providing a magnetic field aligned in the operating region with that of said primary magnet to assist in the establishment of said primary magnetic field;

said primary permanent magnet being the object supported in said operating region.

13. A system for levitating or suspending an object in a force field comprising
   at least one means for establishing a primary electric field having an energy density divergence which is oriented in a preselected direction in an operating region;
   at least one means for generating a secondary electric field within said primary electric field, the electric field lines of force of said secondary electric field in the operating region being in a direction opposite to the electric field lines of force of said primary electric field;
   at least one means for detecting the total electric field strength within said operating region; and
   at least one means responsive to said detecting means for controlling the electric field strength of said secondary electric field in response to the total electric field strength at said operating region so that an increase in the total electric field strength results in an increase of the oppositely directed secondary electric field and vice versa,
   and said object being levitated is a part of one of said field generating means and is thereby levitated by the repulsive forces which act upon said field generating means.

14. A system in accordance with claim 13 wherein
   said secondary electric field generating means includes three orthogonally oriented electric field generating means;
   said detecting means includes three of said means for detecting the electric field strengths at the operating region common to each of said three orthogonal secondary electric fields, respectively, and
   said controlling means includes three means for controlling the electric field strengths of said three orthogonal secondary electric fields so that the change in magnitude of the total electric field strength at said operating region is reduced.

15. A system in accordance with claim 14 wherein
   said secondary electric field generating means each includes a pair of parallel plates having voltages thereon for providing a voltage difference therebetween; and
   said controlling means each includes amplifier means for supplying output control voltages to said parallel plates.

* * * * *